US006082869A

United States Patent [19]

Draheim

[11] Patent Number: 6,082,869

[45] Date of Patent: Jul. 4, 2000

[54] DOOR/WINDOW MOUNTED SAFETY MIRROR

[76] Inventor: Jon M Draheim, N. 210 Van Handel Dr., Appleton, Wis. 54915

[21] Appl. No.: 09/289,400

[22] Filed: Apr. 1, 1999

[51] Int. Cl.$^{7}$ .............................. F21S 1/02; F21V 33/00; F21V 7/00; G02B 7/00

[52] U.S. Cl. .......................... 362/145; 362/147; 362/253; 362/297; 359/367; 359/503; 359/504; 359/855; 359/871; 359/903; 49/171

[58] Field of Search .................................... 359/367, 503, 359/504, 834, 855, 871, 894, 895, 903, 402, 403; 49/171; 362/297, 298, 346, 253, 145, 147

[56] References Cited

U.S. PATENT DOCUMENTS

| | | | |
|---|---|---|---|
| 328,606 | 10/1885 | Park | 359/855 |
| 784,344 | 3/1905 | Pearson et al. . | |
| 1,533,742 | 4/1925 | Kilpatrick | 359/855 |
| 1,931,577 | 10/1933 | Easterday et al. . | |
| 2,125,635 | 8/1938 | Hobart . | |
| 2,176,554 | 10/1939 | Hardy | 359/504 |
| 2,244,235 | 6/1941 | Ayres | 359/504 |
| 2,262,203 | 11/1941 | Redstone et al. | 359/504 |
| 2,491,758 | 12/1949 | Nichols et al. | 359/504 |
| 3,792,198 | 2/1974 | Hanson et al. | 359/855 |
| 3,910,676 | 10/1975 | Fojtik et al. | 359/504 |
| 5,134,550 | 7/1992 | Young . | |

FOREIGN PATENT DOCUMENTS

| | | | |
|---|---|---|---|
| 0103301 | 3/1984 | European Pat. Off. | 359/504 |
| 075 9341 | 2/1934 | France | 359/403 |

*Primary Examiner*—Ricky D. Shafer
*Attorney, Agent, or Firm*—Michael I Kroll

[57] ABSTRACT

The present invention 10 discloses a safety mirror 10 designed to be attached to the outside of an outwardly opening door 14 and to be viewed from the inside of the door by the user 12 looking through the fireproof door window 18. The safety mirror 10 has a housing 42 open 43 on its lateral sides having two generally vertically positioned convex mirrors 48 mounted therein being oppositely disposed so that the viewer 12 can see to the left 38 and to the right 40 for traffic moving toward or away from the path of the outwardly opening door 14. The housing 42 of the device has a flange 44 about its periphery and has fastening means 47 for attachment to the outside of the door 14. The device also has an LED 50 mounted in its housing which is viewable from the front of the device or from either side of the device. Other embodiments are disclosed wherein the device is constructed without a light, or with only one mirror for use with comer doors, or further having a third mirror horizontally positioned above the two generally vertically positioned convex mirrors 48 for upwardly viewing objects which might be operating overhead such as a crane.

14 Claims, 9 Drawing Sheets

DOOR/WINDOW MOUNTED SAFETY MIRROR

BACKGROUND OF THE INVENTION

FIELD OF THE INVENTION

The present invention relates generally to mirrors and, more specifically, to a door/window mounted safety mirror having a housing having two convex mirrors mounted therein being oppositely opposed and positioned divergent from the off-center front of the housing to the back side of said housing and wherein said device is fastened to the door/window on the exterior side of the door using the housing flange and fastening means, such as screws or double faced tape, said device thereby permitting a two way angular field of vision to alert either the individual opening the door or pedestrian traffic that there is another individual in close proximity to and may result in said door being opened into the path of said pedestrians.

Also said device having a light mounted in the front center surface of said housing, batteries and circuitry to cause said light to blink. Said light serving the purpose of drawing an individuals attention to and encouraging use of the door/window mounted safety mirror.

In addition another embodiment is provided without the light, batteries or circuitry.

An additional embodiment is provided wherein said device is constructed with one mirror for corner doors.

Another additional embodiment is provided having a third mirror horizontally positioned over the first two to provide an upward view for those areas where objects are being moved overhead, such as by crane.

DESCRIPTION OF THE PRIOR ART

There are other multi-faceted mirror devices designed to enhance field of vision. Typical of these is U.S. Pat. No. 5,594,594 issued to Ung on Jan. 14, 1997.

Another patent was issued to Rachels, Sr. on Jan. 30, 1996 as U.S. Pat. No. 5,488,515. Yet another U.S. Pat. No. 5,262,901 was issued to Degnan on Nov. 16, 1993 and still yet another was issued on Sep. 24, 1907 to Johnson as U.S. Pat. No. 866,658.

U.S. Pat. No. 5,594,594

Inventor: Ly W. Ung

Issued: Jan. 14, 1997

A triangular prism mirror mounted adjacent a driver of a vehicle to enable the driver to view the blind spot area without distortion of vision. The triangular prism mirror unit has three plane surfaces, the rear surface being blocked. By blocking the rear surface of the prism, the image entering one of the front surfaces will appear on the other front surface. Therefore the triangular prism mirror, when properly mounted, provides a clear vision for the driver of a vehicle giving access to the blind spot area.

U.S. Pat. No. 5,488,515

Inventor: David D. Richels, Sr.

Issued: Jan. 30, 1996

A new and improved hood mounted safety mirror for vehicles comprised of an elongated stem portion having a top surface, a bottom surface, a front portion, a back portion, and two side portions. The two side portions has an elongated mirror secured thereto. The elongated stem portion is secured to a center portion of a hood of a car. An arrow portion is integral with the front portion of the stem portion. The arrow portion has an inner surface, an outer surface, a top surface, a bottom surface, and two outwardly extending portions has a mirror secured thereto. Each of the two outwardly extending side portions is angled at a position as such to allow a driver to view obstructions off to a side of the car as reflected from the mirrors on the side portions of the stem portion to the mirrors within the recess of the outwardly extending side portions to eyes of the driver.

U.S. Pat. No. 5,262,901

Inventor: Donald E. Degnan

Issued: Nov. 16, 1993

A viewing device for installation on a wall or door includes a housing projecting from the front surface of the door and defining a plurality of surveillance ports disposed axially, and non-axially relative to the axis of the housing. By means of a knob extending outwardly from the rear door surface and defining a viewing port axially aligned with the axial surveillance port, the user is able to move a mirror between a first orientation intersecting the housing axis at an acute angle and a second orientation parallel to and spaced from the housing axis. Rotation of the knob relative to the housing causes rotation and pivoting of the mirror so that, when the mirror is in the first rotation and pivoting of the mirror so that, when the mirror is in the first orientation, a line of sight is defined at different times from the viewing port through each of the non-axial surveillance ports via the mirror and, when the mirror is in the second orientation, a line of sight is defined from the viewing port directly through the axial surveillance port.

U.S. Pat. No. 866,658

Inventor: Camilla J. Johnsen

Issued: Sep. 24, 1907

This United States Patent discloses a device adapted to be fastened to the frame of a window, and by means of which a person within a room may see up and down a street without raising the window or putting the head out the window. Said device being attached to a window sill by a bracket having a socket formed thereon, a forked arm and mirrors fixed upon the forked end of said arm.

U.S. Pat. No. 646,216

Inventor: Oscar Hillstrom

Issued: Mar. 27, 1900

This United States Patent discloses a device which may be placed in front of a window of a house to permit of seeing objects at the sides of the window without opening the same. Said device being a reflector formed of a number of mirrors arranged in pyramidal form and having an opening in the apex, a web extending across the base of the reflector, a tubular socket formed on the web, the web having an opening in the center thereof, in alignment with the opening in the apex of the reflector, and a stopper removably fitted in the opening in the apex of the reflector.

U.S. Pat. No. 323,191

Inventor: Siegfried L. F. Melohn

Issued: Jul. 28, 1885

This United States Patent discloses a device for reflecting rays of light, which device is adapted to be stationed outside a window or other convenient place, and thereby overseers, watchman, detectives, or persons whose duty or curiosity so directs are enabled while within the room and at some distance from the window before which the device is placed, to see and note whatever is transpiring or existing on the outside of the room, either up or down the street or other locality at the right or left of the device. Said device consisting of two outwardly-extending wings affixed rigidly to each other at an angle at their inner ends, which wings are strengthened and made firm in such position by a triangular block inserted in the angle between them and made rigid thereto, which frame is supported and made movable upon the arm and said arm at its outer end is journaled in the triangular block affixed to and part of a frame and on which arm said frame, being movable, as stated, is adjustable, being adapted to be held in the position desired by set-screw turning in said triangular block against the arm.

While these multi-faceted mirrors may be suitable for the purposes for which they were designed, they would not be as suitable for the purposes of the present invention, as hereinafter described.

SUMMARY OF THE PRESENT INVENTION

The present invention discloses a safety mirror designed to be attached to the outside of an outwardly opening door and to be viewed from the inside of the door by the user looking through the fireproof door window. The safety mirror has a housing open on its lateral sides having two generally vertically positioned convex mirrors mounted therein being oppositely disposed so that the viewer can see to the left and to the right for traffic moving toward or away from the path of the outwardly opening door. The housing of the device has a flange about its periphery and has fastening means for attachment to the outside of the door. The device also has an LED mounted in its housing which is viewable from the front of the device or from either side of the device. Other embodiments are disclosed wherein the device is constructed without a light, or with only one mirror for use with corner doors, or further having a third mirror horizontally positioned above the two generally vertically positioned convex mirrors for upwardly viewing objects which might be operating overhead such as a crane.

A primary object of the present invention is to provide a means of viewing to the right and left of a door before pushing open said door, as well as, allowing viewing from the right or left of the door to the front of the door.

Another object of the present invention is to provide a door/window mounted safety mirror having a flanged housing which can be installed and fastened onto a door having a window without substantially obstructing the view through said window.

Yet another object of the present invention is to provide a door/window mounted safety mirror having a flanged housing which can be installed and fastened onto a door using screws or double faced tape.

Another object of the present invention is to provide a door/window mounted safety mirror having a flanged housing therein having one or more convex mirrors and said housing having a light mounted therein, having batteries, and circuitry causing said light to blink.

Additional objects of the present invention will appear as the description proceeds.

The present invention overcomes the shortcomings of the prior art by providing a door/window mounted safety mirror having a housing having two convex mirrors mounted therein and secured onto the exterior side of said door/window using the housing flange and fastening means, such as screws or double faced tape, and said device having a light mounted in the front center surface of said housing, batteries and circuitry to cause said light to blink. Said light serving the purpose of drawing an individuals attention to and encouraging use of the door/window mounted safety mirror. In addition another embodiment is provided without the light, batteries or circuitry. An additional embodiment is provided wherein said device is constructed with a single viewing mirror for corner doors. Another additional embodiment is provided having a third mirror horizontally positioned over the first two providing means for upward viewing for those areas where objects are being moved overhead.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
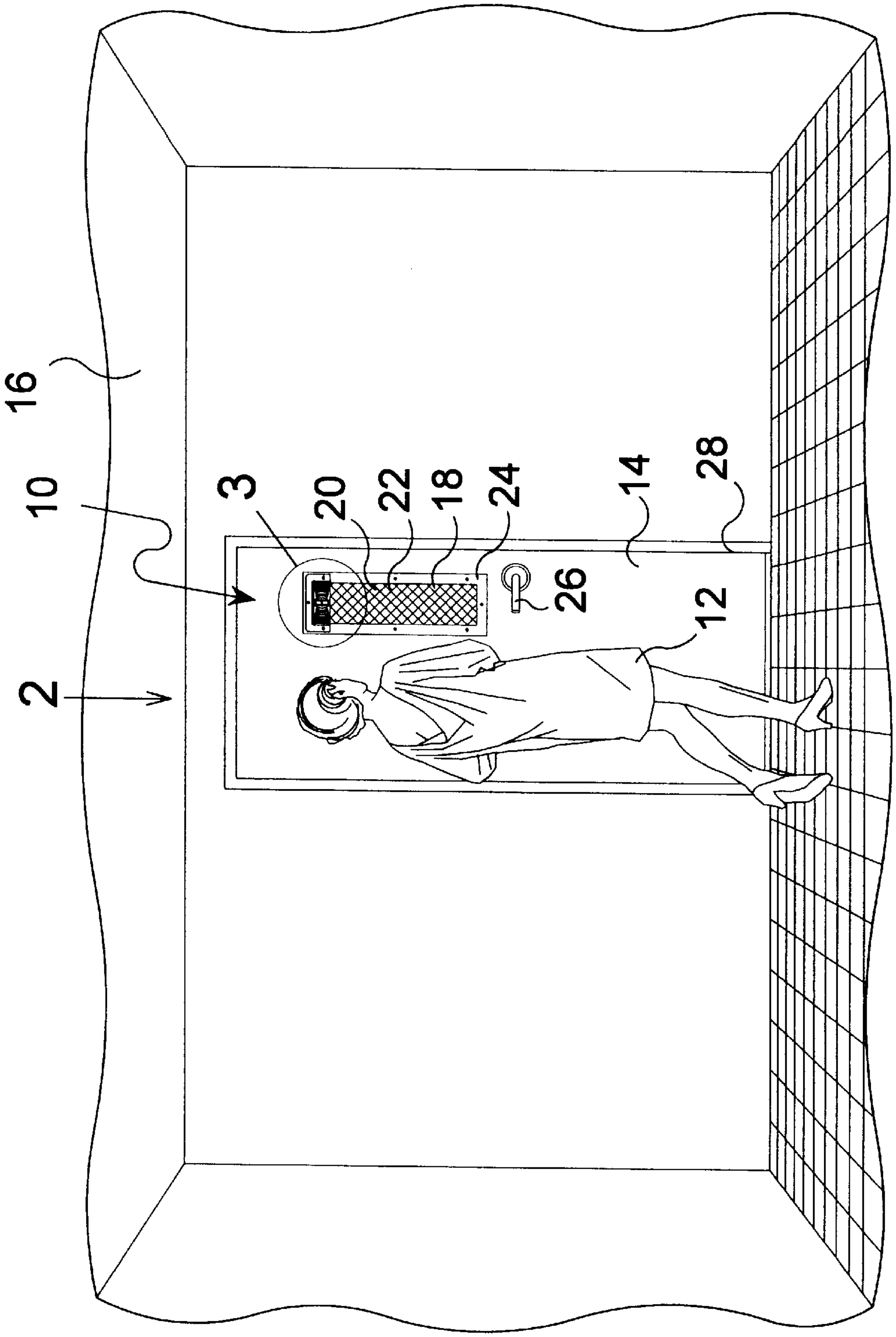
FIG. 1 is a perspective view of the present invention in use. Shown is an individual about to exit a room through a windowed door having the safety mirror installed in the upper portion of the door window whereby the individual leaving the room is able to perform a visual check of the area to the left and right of the door before opening the door. The safety mirror can be selectively placed on any door having a window/portal therein.

With regard to the reference numerals used, the following numbering is used throughout the drawings.

| | |
|---|---|
| 10 | present invention |
| 12 | user |
| 14 | door |
| 16 | room |
| 18 | door window |
| 20 | window glass |
| 22 | window safety wire |
| 24 | window frame |
| 26 | door handle |
| 28 | door casing |
| 30 | door hinge |
| 32 | room wall |
| 34 | aisle way |
| 36 | pedestrian |
| 38 | left viewing angle |
| 40 | right viewing angle |
| 42 | housing |
| 43 | side opening of housing |
| 44 | flange |
| 46 | holes |
| 47 | fastening means |
| 48 | convex mirrors |
| 50 | light |
| 52 | power source |
| 54 | electrical circuit elements |
| 56 | sight beams |
| 58 | viewing area |
| 60 | double faced tape |

-continued

| | |
|---|---|
| 62 | forward mirror mounting means |
| 64 | rear mirror mounting means |
| 66 | access panel |

DESCRIPTION OF THE PREFERRED EMBODIMENT(S)

Turning now descriptively to the drawings, in which similar reference characters denote similar elements throughout the several views, FIGS. 1 through 9 illustrate the present invention being a safety mirror for outwardly opening doors.

Turning to FIG. 1, therein is shown a perspective view of the present invention 10 in operative connection. Shown is an individual user 12 approaching an outwardly opening door 14 as the user is about to exit from the room 16. Note that the door 14 has a rectangularly shaped fire proof window 18 mounted therein with the window having see-through glass 20 with safety wire 22 running throughout the window 18 the window 18 being mounted to the door 14 in a window frame 24. Note that the window may be a standard size fireproof window being about 5 inches in width and about 20 inches in height as would be done in standard practice by one skilled in the art. Also note that the door is equipped with a handle 26 and is mounted in the standard manner in a door frame casing 28. The door glass 18 is positioned at approximately the eye level of the user 12 and the safety mirror is installed in the upper portion of the door glass 18 in order that the individual user 12 leaving the room 16 is able to perform a visual check of the outer area to left of and to the right of the outwardly opening door 14 path prior to actually opening the door 14. The safety mirror 10 can be selectively placed on any door having a window/portal therein.

Figure 2:
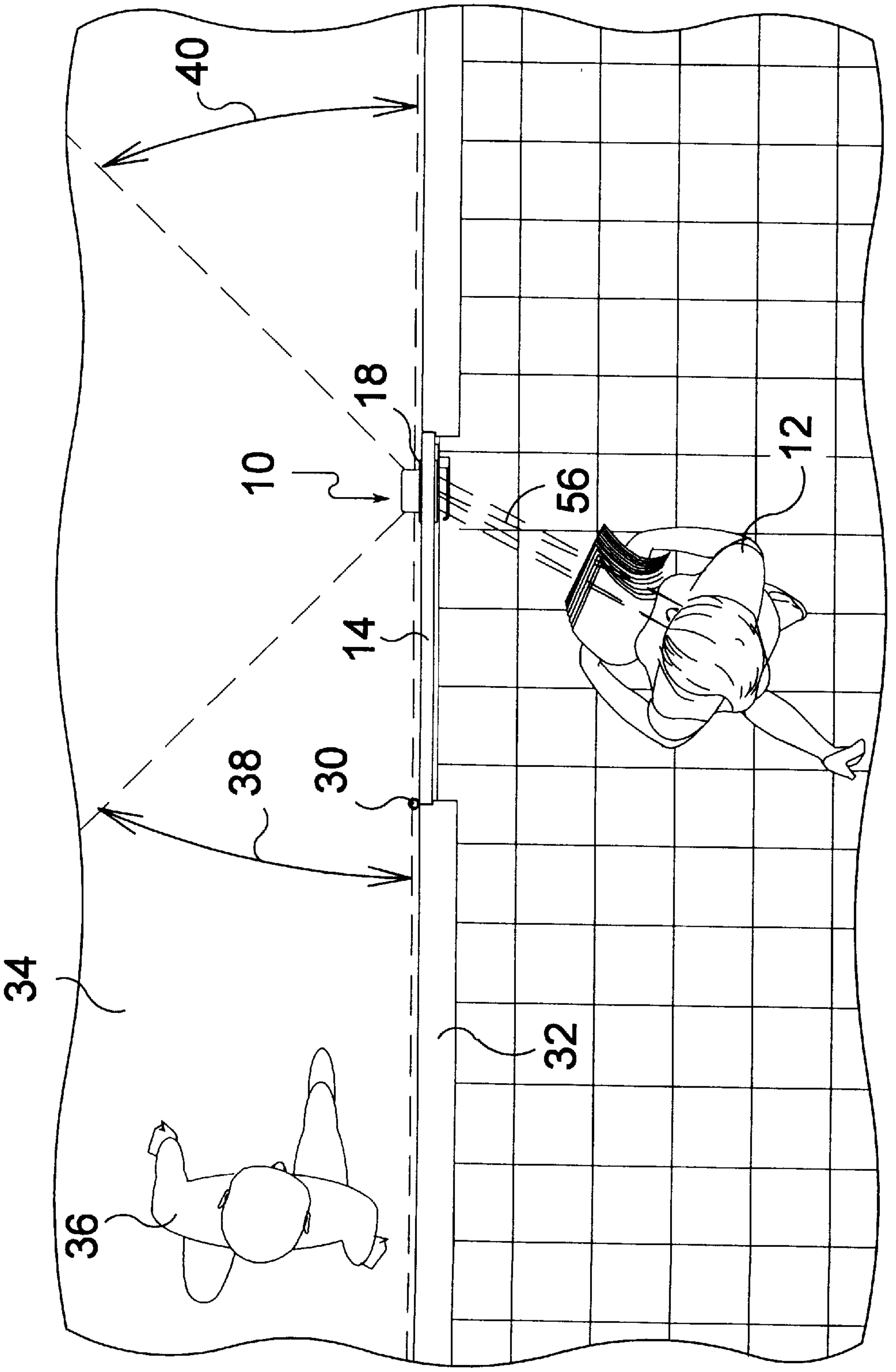
FIG. 2 is a top plan view, taken in the direction of the arrow labeled with the numeral 2 in FIG. 1 as indicated, showing the area on both sides of the door wherein an individual, using the present invention, performs a visual check of the area to the left and right of the door and is able to see the presence of any other individual in the vicinity of the door without eliminating the ability to use the door window to see directly ahead of the door.

Turning to FIG. 2, therein is shown a top plan view, taken from FIG. 1 as indicated, showing a user 12 approaching the outwardly opening door 14 with the present invention 10 mounted on the outside of door 14. Shown therein are the door 14 having a hinge 30 connecting the door to the wall 32 which will allow the user to exit from the room. The door 14 is an outwardly opening door so that when it opens it will move into the aisleway 34 and therefore block the path of the pedestrian 36 as the pedestrian approaches the door 14. If the door 14 is opened at the same time that the pedestrian 36 is near the path of the door, the door would strike the pedestrian 36. In order to avoid such a collision the user 12 can perform a visual check shown by eye sight beams 56 of the areas to the left 38 and to the right 40 of the door to view any on coming pedestrians. If an oncoming pedestrian is present the user 12 will wait to open the door 14 until the pedestrian 36 is no longer in the path of the door 14. Also shown therein is the viewing angle 38 to the left of the door 14 and viewing angle 40 to the right of the door 14.

Figure 3:
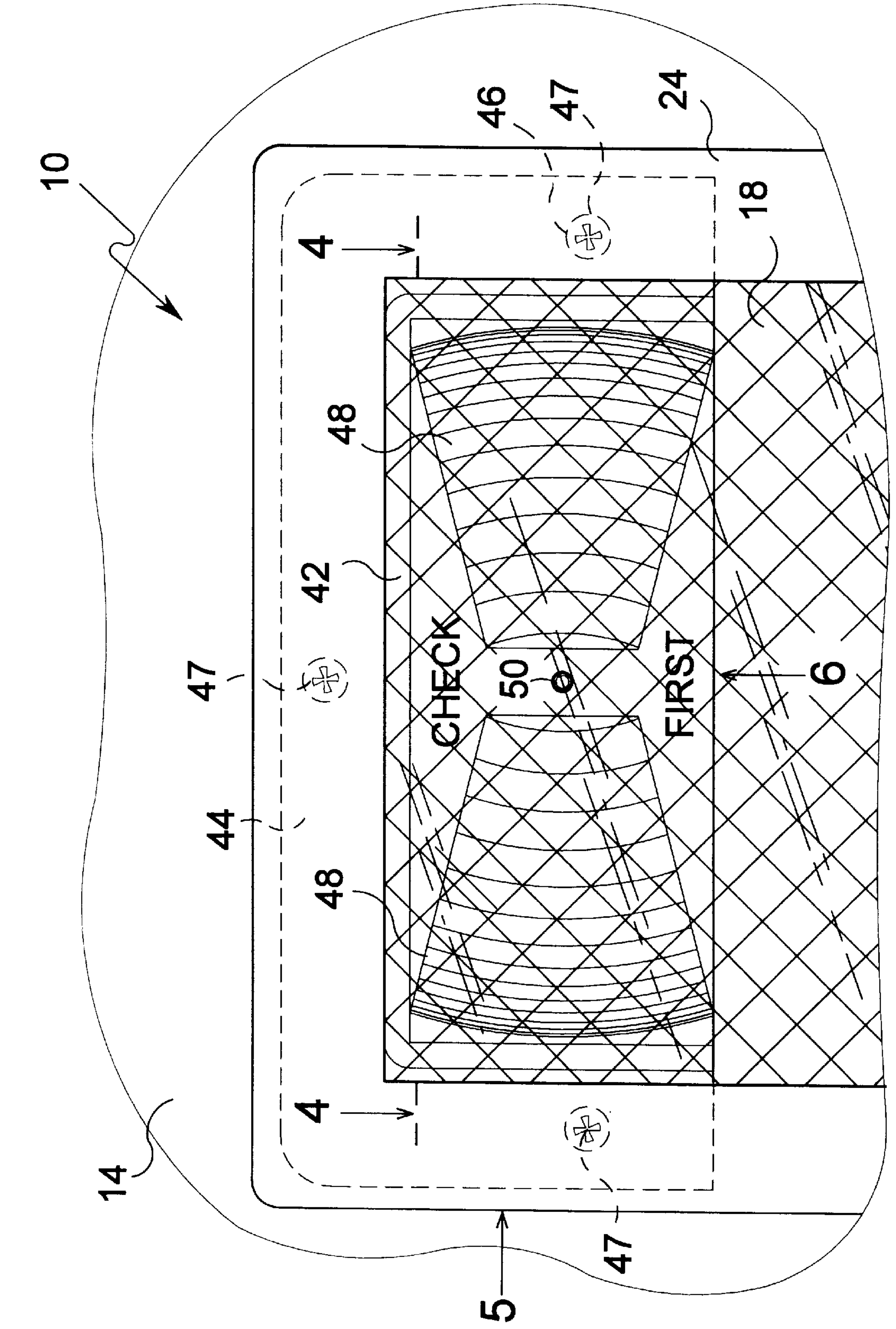
FIG. 3 is an enlarged front view of the safety mirror of the present invention, taken within the circle labeled with the numeral 3 in FIG. 1 as indicated. Shown is the safety mirror having been manufactured to fit onto the door window and having pre drilled holes in the safety mirror housing flange conforming to the pre existing fastening means for the door window. Also shown are two convex mirror contained within said housing and having a light therein for the purposes of drawing an individuals attention to the safety mirror upon approaching the door.

Turning to FIG. 3, therein is shown an enlarged front view of the safety mirror of the present invention 10, taken from FIG. 1 as indicated. Shown is the safety mirror 10 having a housing 42 made of rigid plastic or like material and a flange 44 having been manufactured to fit onto the outside of a door 14 by attachment to the door window glass 18 and frame 24 having pre-drilled holes 46 therein in the safety mirror flange 44 conforming to the pre-existing fastening means 47 being screws or the like of the door window frame 24 which pass through holes 46. Also shown are two convex mirrors 48 or other appropriate reflector means contained within said housing 42 having a light 50 or light emitting diode therein for the purpose of attracting the user's attention to the safety mirror 10 mounted upon the door 14. The housing 42 could be made with the integral flanged mounting face 44 having three pre-drilled countersunk holes that would correspond to and be aligned with the three uppermost pre-existing fasteners on a standard 5 inch by 20 inch rectangular door mounted window which would allow easy attachment of the present invention 10 to the door 14.

Figure 4:
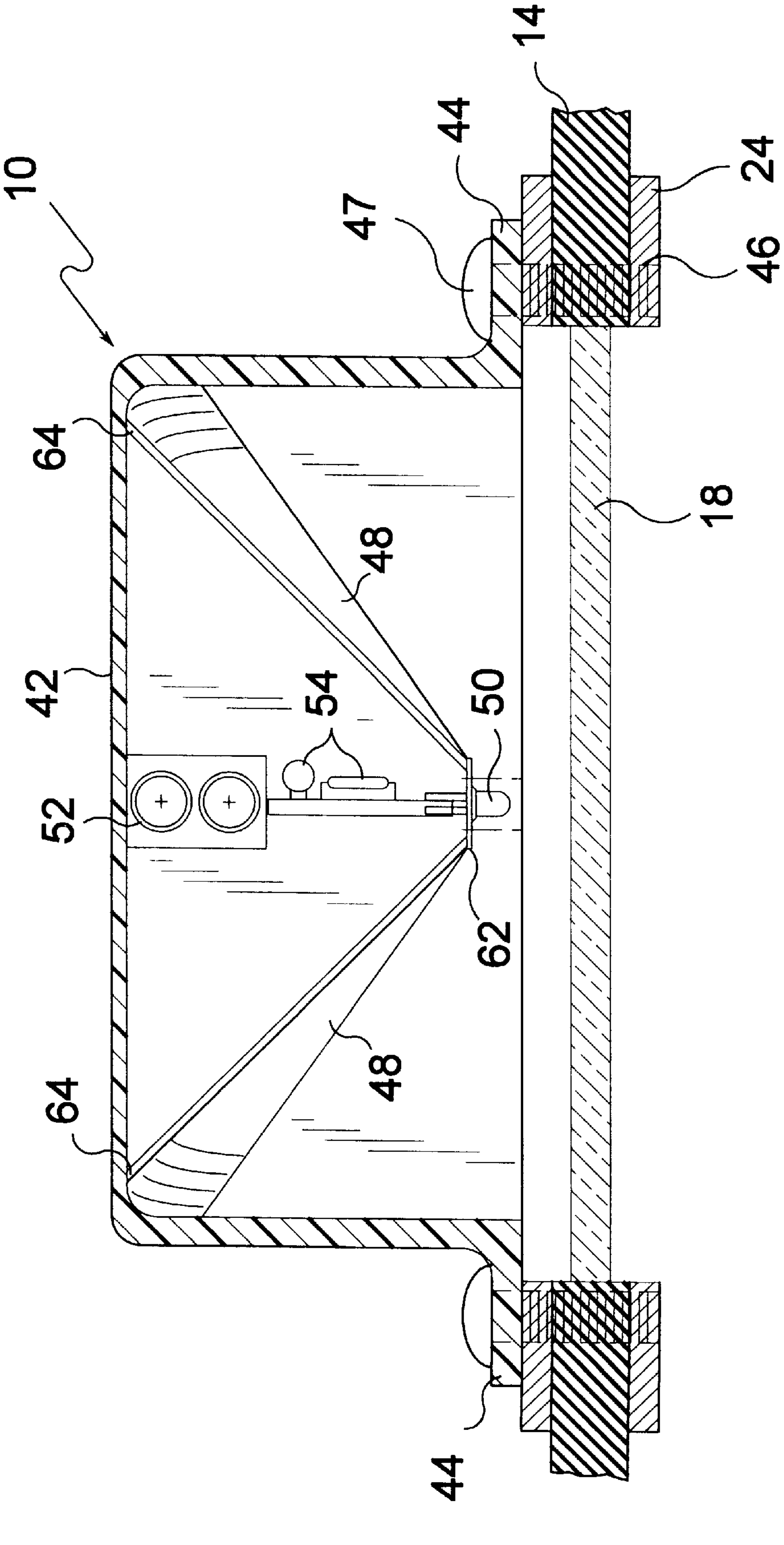
FIG. 4 is top cross sectional view of the safety mirror, taken from FIG. 3 as indicated, showing the safety mirror installed onto the door window, having two convex mirrors, for the purposes of allowing visual inspection of the areas to the left and right of the door by an individual approaching the front of the door as well as permitting an individual approaching from the exterior sides of the door to see an individual approaching the front of the door. Also shown in outline is a light having a power source and circuitry to cause said light to blink thereby drawing an individuals attention to the safety mirror when approaching the door.

Turning to FIG. 4, therein is shown a top cross-sectional view of the present invention 10 taken from FIG. 3 as indicated, showing the present invention 10 installed onto the outside of the door window 18. Also shown therein is the door 14, the window frame 24, apertures 46, and fastening means 47 for attaching the present invention 10 to the door 14. Shown are the housing 42 and its flange 44. Also shown are the two convex mirrors 48 along with the light 50. The pair of convex mirrors 48 are generally vertically positioned in the housing 42 being angled from the front center of said housing toward the rear lateral edges of said housing whereby an individual approaching the door from the inside can see through the door window to said pair of convex mirrors and thereby can view the area to the left and the area to the right on the outside of the door. The mirrors 48 allow the user visual inspection of the areas to the left and right of the door as the user approaches the door and, in addition thereto, would allow a pedestrian approaching the door on the outside of the door 14 to see an individual user 12 approaching the front of the door 14. Also shown is the light 50 having a power source 52 along with appropriate electrical circuitry elements 54 which would cause the light 50 to intermittently blink which would draw attention of both the user 12 and a pedestrian 36 to the safety mirror of the present invention 10 as they approach the door 14. The electrical circuit elements would be appropriately connected to the light 50 to cause it to intermittently blink and would be connected thereto as would be done in standard practice by one skilled in the art. A forward mounting means 62 is shown along with a rear mirror mounting means 64 for attaching the convex mirrors 48 to housing 42 as would be done in standard practice by one skilled in the art. Light 50 also mounts on means 62 common with mirrors 48.

Figure 5:
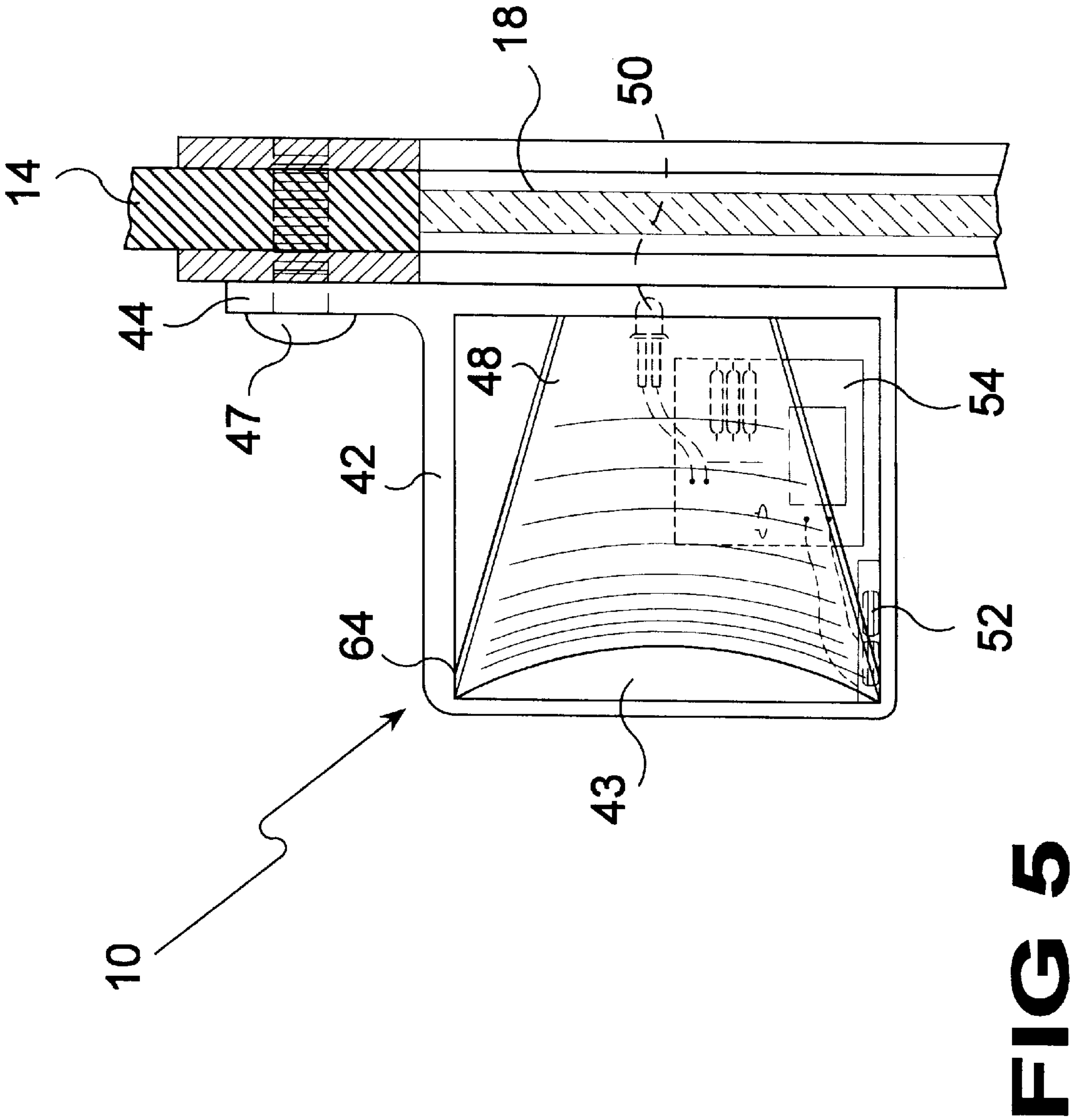
FIG. 5 is a side view of the safety mirror, taken from FIG. 3 as indicated, showing the safety mirror installed onto the door window and one of the mirrors allowing visual inspection of the area in front of the door. Also shown in outline is a light having a power source and circuitry to cause said light to blink.

Turning to FIG. 5, therein is shown a side view of the safety mirror of the present invention 10, taken from FIG. 3 as indicated, showing the present invention 10 installed onto the outside of door window 18. Also shown is one of the convex safety mirrors 48 contained within the housing 42 and the opening 43 on the lateral edge of the housing located on both sides of the housing 42. Also shown is a flange 44 with fastening means 47 for connection to the door 14. Also shown in outline is the light 50 viewable from the front and sides of the device having a power source 52 and appropriate electrical circuit elements 54 being an electrical controller circuit and timer circuit mounted on a circuit board which cause the light 50 to blink or be turned on and off intermittently.

Figure 6:
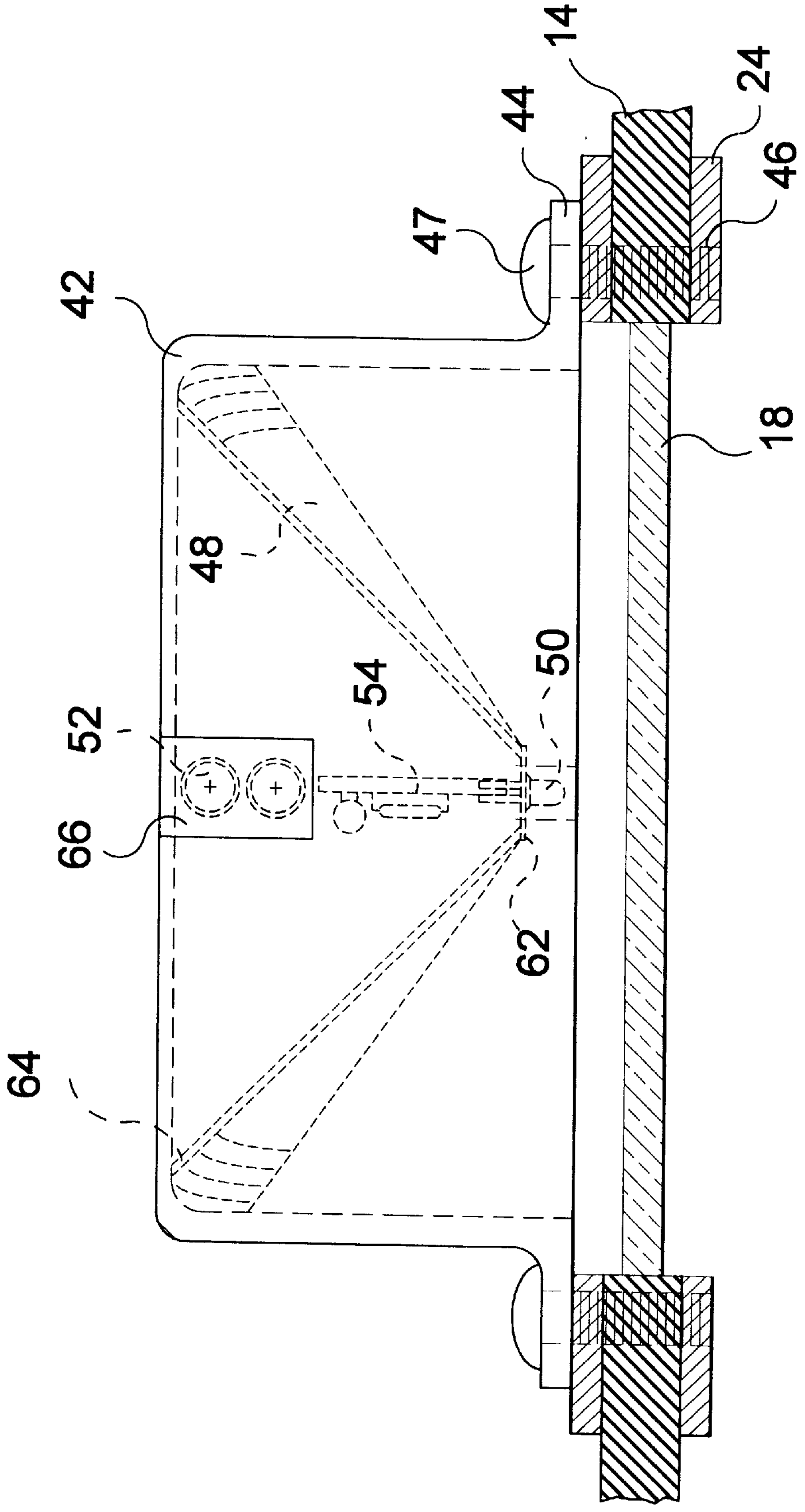
FIG. 6 is a bottom view of the safety mirror, taken from FIG. 3 as indicated, showing the access panel to the power source for the light. Also shown in outline is the light and circuitry to cause said light to blink and the two convex mirror contained within the housing.

Turning to FIG. 6, therein is shown a bottom view of the present invention 10 taken from FIG. 3 as indicated, showing the access panel 66 to the power source 52 being batteries or the like for the light 50. Shown therein is the door 14, the window frame 24, apertures 46, and fastening means 47 for attaching the present invention 10 to the door 14. Also shown are the housing 42 and its flange 44. Also shown are the two convex mirrors 48 along with the light 50. Other features are shown similar to FIG. 4.

Figure 7:
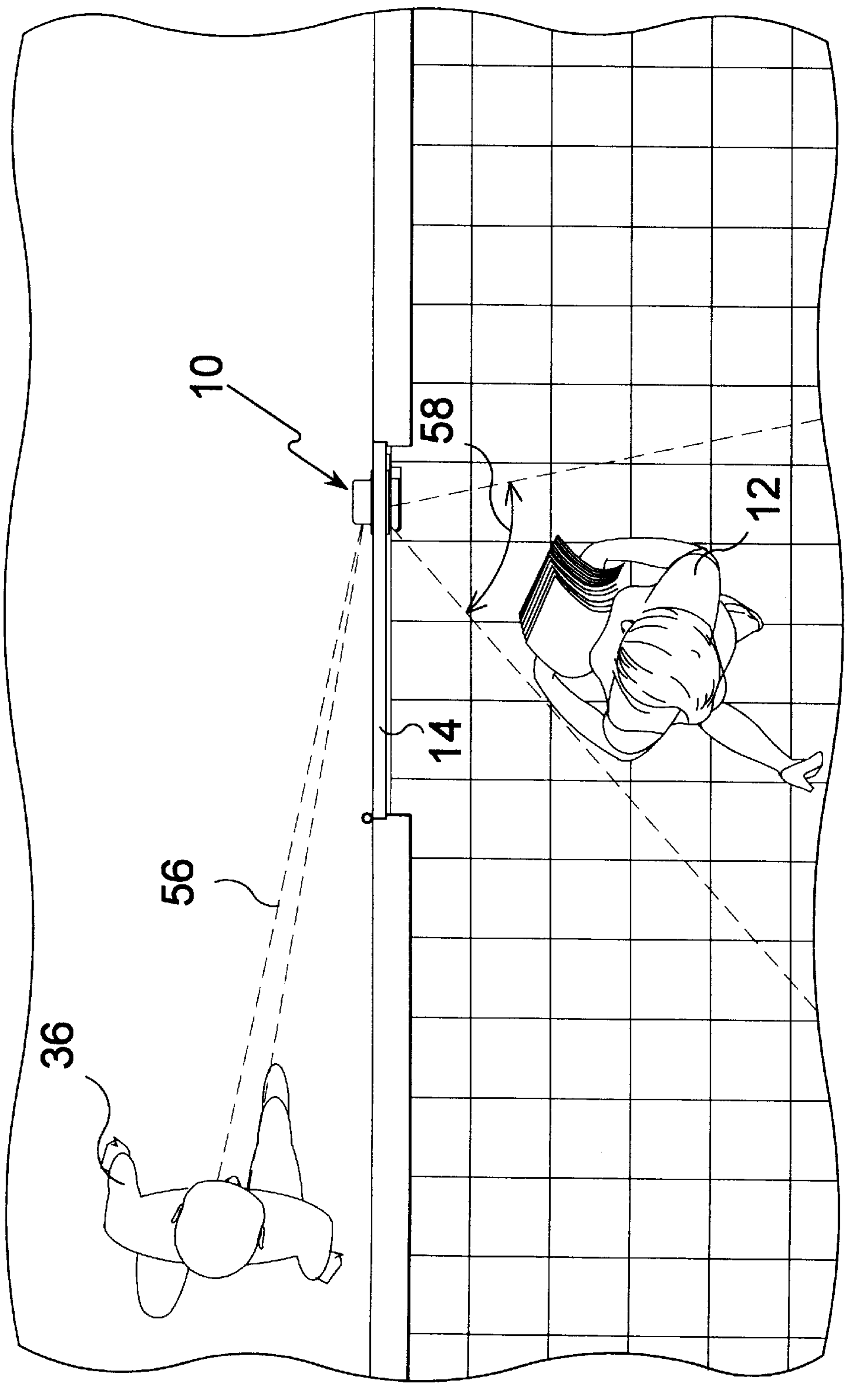
FIG. 7 is a perspective view of the present invention in use. Shown is an individual about to pass a door using the safety mirror to perform a visual check to see if anyone is in front of the door.

Turning to FIG. 7, therein is shown a perspective view of the present invention 10 in use. Shown therein is an individual pedestrian 36 approaching a door 14 having the present invention 10 mounted thereon showing the eye sight beams 56 of the pedestrian traveling toward the present invention 10 thereby allowing the pedestrian 36 to perform a visual check in the inner area 58 in order to view the oncoming user 12 of the door. The present invention 10 allows a user 12 or 36 on either side of the door 14 to view traffic on the other side of the door 14.

Figure 8:
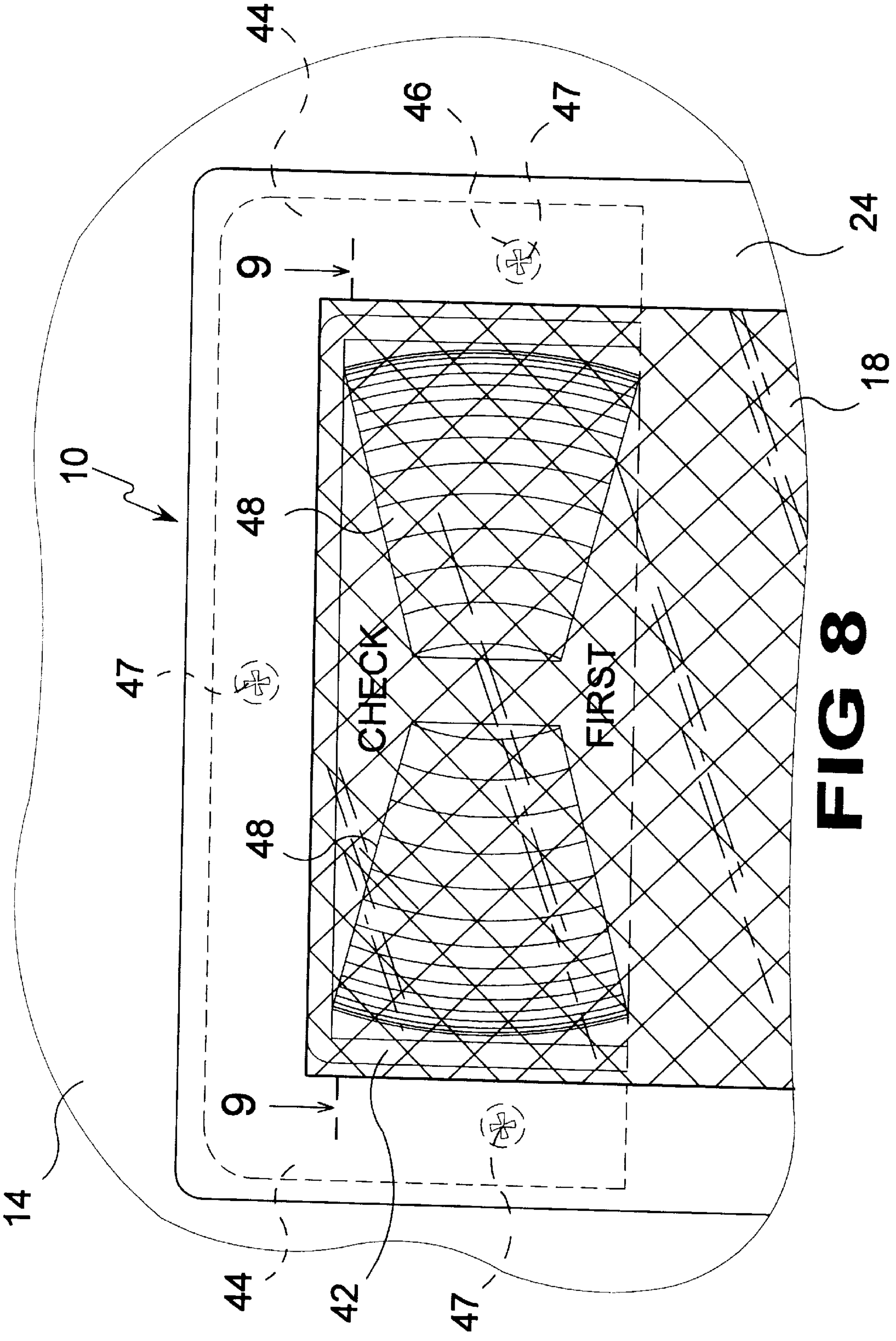
FIG. 8 is an enlarged front view of the alternate embodiment of the present invention. Shown is the safety mirror having been manufactured to fit onto the door window. Also shown are two convex mirrors contained within a housing providing means for visually inspecting the exterior areas to the left and right of the door before opening said door.

Turning to FIG. 8, therein is shown an enlarged front view of an alternate embodiment of the present invention 10 without the light 50 being a part thereof. Shown is the safety mirror 10 having a housing 42 and a flange 44 having been manufactured to lit onto the outside of a door 14 by attachment to the door window glass 18 and frame 24 having pre-drilled holes 46 therein in the safety mirror flange 44 conforming to the pre-existing fastening means 47 of the door window frame 24. Also shown are two convex mirrors 48 contained within said housing 42.

Figure 9:
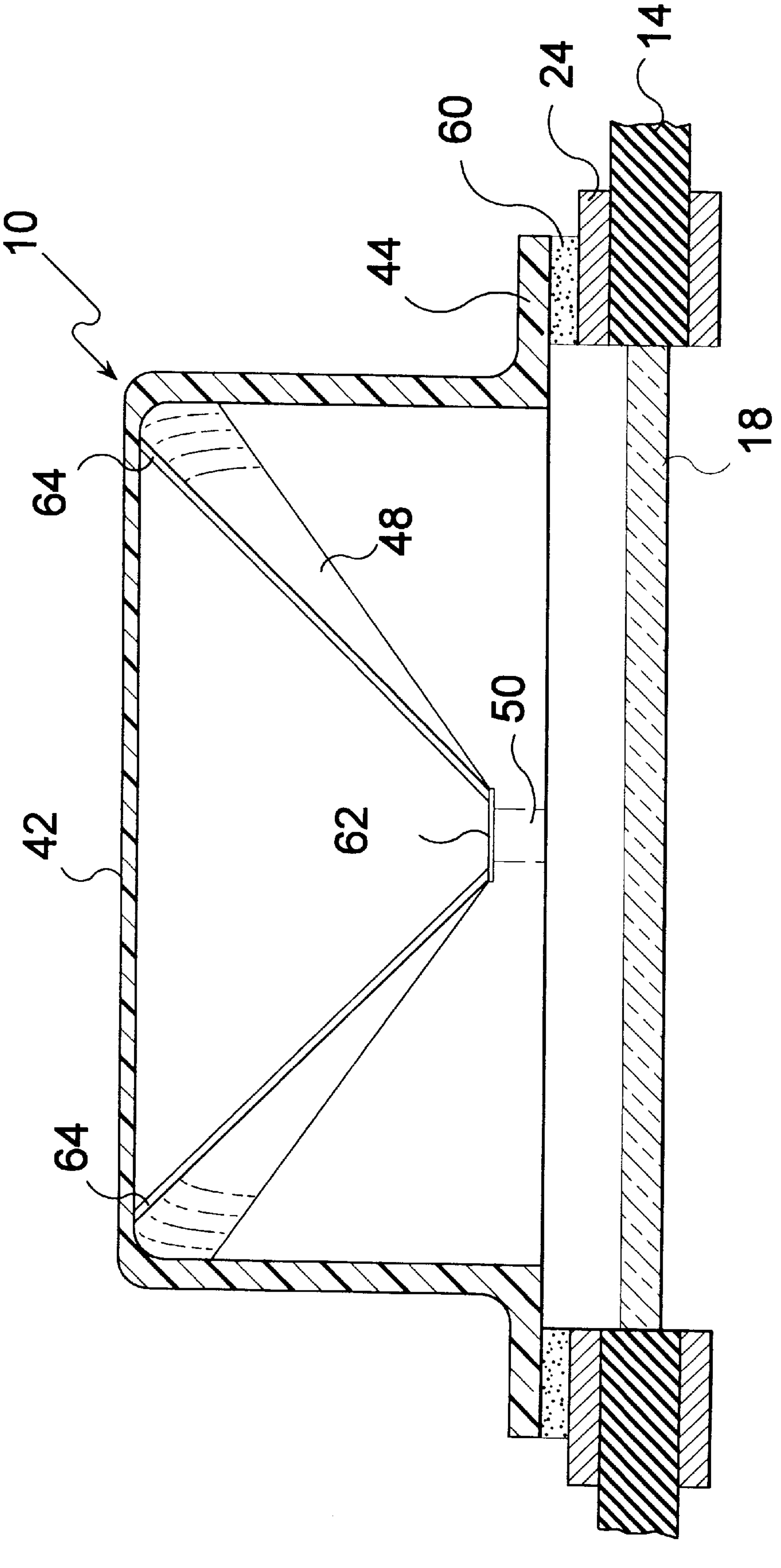
FIG. 9 is view of the safety mirror, taken from FIG. 8 as indicated, showing the safety mirror installed onto the exterior side of the door window using an adhesive double faced tape. Said safety mirror having two convex mirrors for the purposes of allowing visual inspection of the exterior areas to the left and right of the door by an individual approaching the front of the door as well as permitting an individual approaching the exterior sides of the door to see an individual approaching the front of the door.

Turning to FIG. 9, therein is shown a top view of the safety mirror of the present invention 10 taken from FIG. 8 as indicated showing the present invention 10 mounted onto the exterior side of the door window 18 using an adhesive doubled faced tape 60. Shown therein is the door 14 and the window frame 24. Also shown are the housing 42 and its flange 44 and two convex mirrors 48 along with the light 50. Mounting means 62 and 64 are also shown. Magnets could also be used in place of the double faced tape.

Alternative embodiments are a unit with no light; a unit having a third convex mirror mounted generally horizontally above the two generally vertically positioned convex mirrors 48 so that objects above the housing could be viewed; and, a unit having only one convex mirror for use with a corner door for viewing the area on the outside of the door away from the wall.

What is claimed to be new and desired to be protected by Letters Patent is set forth in the claims:

1. A viewing device for a window of a door, comprising;

a) a housing;

b) said housing having two lateral sides, each lateral side having an opening therein;

c) a first means for mounting said housing to the outside of a door;

d) reflector means positioned in said housing for allowing a first individual approaching the front of the door to view the area to the left and the area to the right on the outside of the door;

e) a second means for mounting said reflector means in said housing; and f) a light positioned in said housing and viewable from a front end side of said housing.

2. The device of claim 1, further comprising a flange on the periphery of said housing.

3. The device of claim 2, wherein said flange further comprising apertures therein.

4. The device of claim 3, wherein said first means for mounting further comprising means for fastening passing through said apertures into the door.

5. The device of claim 3, wherein said apertures placed in said flange being aligned with pre-existing fasteners for the door window.

6. The device of claim 2, wherein said first means for mounting further comprising double faced tape positioned between said flange and said door.

7. The device of claim 1, wherein said first means for mounting said housing to the door further comprises said housing being mounted on the window of the door.

8. The device of claim 1, wherein said first means for mounting further comprises screws.

9. The device of claim 1, wherein said reflector means further comprising a pair of mirrors.

10. The device of claim 1, wherein said reflector means further comprising a pair of convex mirrors.

11. The device of claim 10, wherein said pair of convex mirrors being angularly disposed away from each other, said pair of convex mirrors being generally vertically positioned in said housing being angled from the front center of said housing toward rear lateral edges of said housing whereby a second individual approaching the door from an inside can see through the window of the door to said pair of convex mirrors and thereby can view the area to the left and the area to the right on the outside of the door.

12. The device of claim 1, wherein said first means for mounting further comprises magnets.

13. The apparatus of claim 1, wherein said housing further comprises plastic.

14. The apparatus of claim 1, wherein said light further comprises a means for controlling, said light further comprises a means for timing whereby said light turns on and off intermittently.

* * * * *